Aug. 4, 1959     J. L. GIBSON     2,898,438

DOMESTIC APPLIANCE

Filed Oct. 30, 1956

INVENTOR.
J Lowell Gibson
BY *Edwin S. Dybvig*
His Attorney

United States Patent Office 2,898,438
Patented Aug. 4, 1959

2,898,438
DOMESTIC APPLIANCE

J Lowell Gibson, Dayton, Ohio, assignor to General Motors Corporation, Detroit, Mich., a corporation of Delaware Application October 30, 1956, Serial No. 619,179

4 Claims. (Cl. 219—37)

This invention relates to a domestic appliance and more particularly to a grease collecting arrangement for a range or the like.

One of the primary problems involved in cooking in the ovens of present day ranges or the like is the control of grease spatter which normally discolors the walls of the oven during the cooking operation. The problem is particularly aggravated during the broiling operation where liquid particles from the load being cooked spatter outwardly onto the walls of the oven liner. This liquid spatter after collecting on the walls and other parts of the oven becomes baked on the oven wall and is extremely difficult to remove therefrom, and tends to discourage the user of the range from performing cooking operations that will necessarily spatter the walls of the oven.

It is therefore an object of this invention to provide means for collecting grease spatter and the like in an oven before the grease reaches the walls of the oven liner, the grease collecting means including means providing an electrostatic field between the load to be cooked and a grease collecting member.

A more specific object is to provide a range oven liner with a load supporting rack and with a grease collecting screen spaced therefrom, the rack and screen being connected across a source of high voltage whereby an electrostatic field is set up therebetween for pulling grease and other liquid particles toward the screen.

Further objects and advantages of the present invention will be apparent from the following description, reference being had to the accompanying drawings, wherein a preferred form of the present invention is clearly shown.

Figure 1:
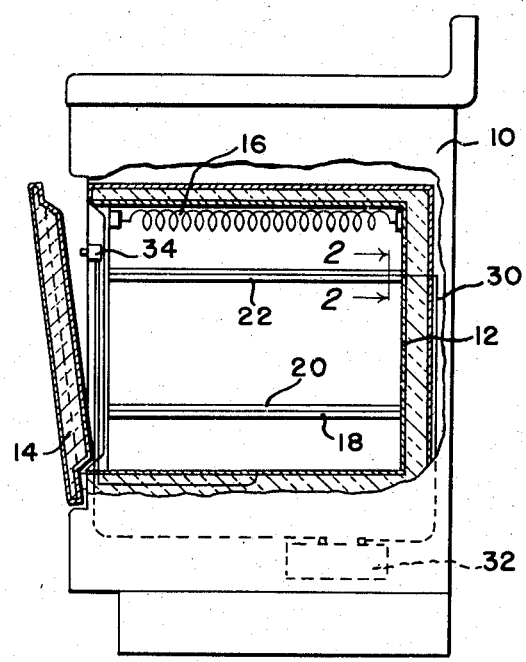
Figure 1 is a side view with parts broken away of a range oven liner provided with the electrostatic grease collection arrangement of this invention.

Referring now to Figure 1, a range having an outer cabinet 10 is provided with an oven liner 12 having a front access opening closable by a door 14. The oven liner is provided with suitable electrical heating elements 16 disposed near the top of the liner, and energized by conventional electrical circuits not shown. The metal oven liner 12 is formed with integral flanges 18 that slidably support metal rack 20. The oven liner is also provided with a pair of screen supporting members 22 that slidably support a metal screen 24.

Figure 2:
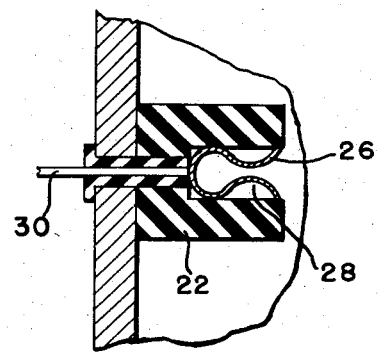
Figure 2 is a sectional view taken along line 2—2 of Figure 1.
Figure 3:
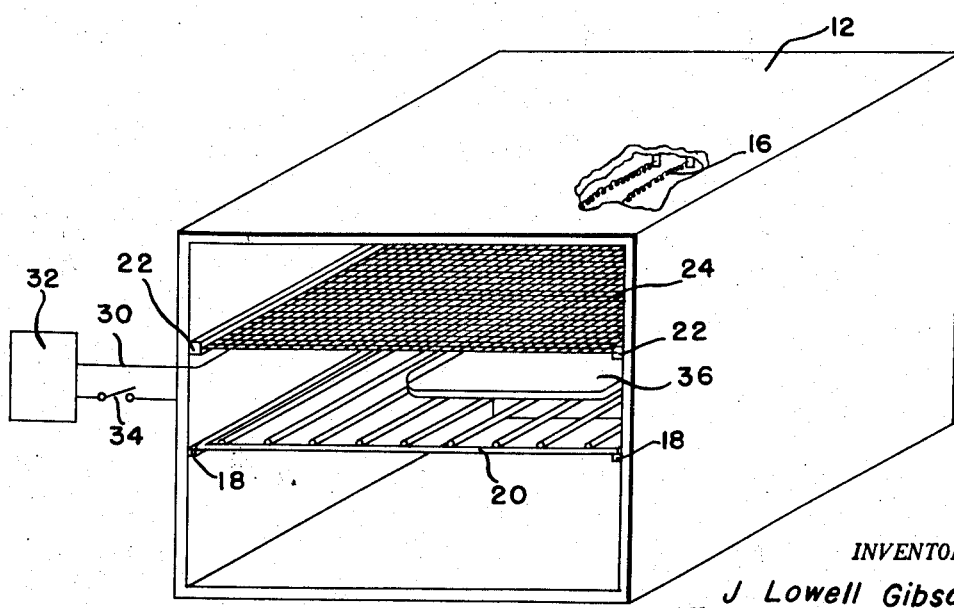
Figure 3 is a perspective view of the oven liner and grease collecting arrangement shown in Figure 1.

The screen supporting members 22 are preferably made of a suitable electrical insulating material and are attached to the inner wall of the oven liner by any suitable insulating means. One or both of the screen supporting members 22 is provided with a spring contact member 26, as shown in Figure 2, which engages the metal screen 24 when the screen is slid rearwardly in the slots 28 formed in the insulating screen supports 22. The spring contact member 26 is connected with an electrical lead 30 that is in turn connected with one side of a high voltage D.-C. power supply 32. The oven liner itself is connected through a door operated switch 34 with the opposite side of the power supply 32. The door operated switch 34 is closed when the door is moved to a fully closed position. With this arrangement it will be apparent that a high voltage electrostatic field is set up between the supporting rack 20, which engages the oven liner, and the metal screen 24 whenever the door switch 34 is closed.

In operation, food to be cooked may be placed on a metal support 36 or may be placed directly on the metal supporting rack 20. During cooking of the food on support 20, liquid particles evolved as an incident of the cooking operation spatter outwardly away from the load and are pulled toward the metal screen 24 by the electrostatic field located between the rack 20 and screen 24. Since the screen is foraminous, the liquid particles adhere to the screen by capillary action. After the cooking operation is completed the screen 24 may be slid outwardly and the grease and liquids cleaned therefrom.

Although the electrostatic grease collecting apparatus has been disclosed in combination with a conventional range, it is apparent that the apparatus is equally applicable to a wall oven or any other sort of cooking apparatus. Moreover the grease collecting apparatus could be used with a gas heated range, and could be used with a microwave oven wherein the contents of the oven are heated by high frequency energy supplied to the interior of the oven liner.

While the form of embodiment of the invention as herein disclosed constitutes a preferred form, it is to be understood that other forms might be adopted, as may come within the scope of the claims which follow.

What is claimed is as follows:

1. An electric range comprising, an oven liner having a front access opening, a door opening and closing said access opening, an electric heating unit located adjacent the top wall of said oven liner, a metallic screen disposed below said heating element and electrically insulated from said oven liner, a food rack disposed below said screen and electrically connected with said oven liner, a direct current power source mounted in said range having a pair of power output terminals connected respectively by power leads to said oven liner and to said screen, and an electric switch connected in series with one of said power leads, said switch being normally open and being closed when said door is moved to a fully closed position.

2. A domestic range comprising, an oven having an access opening, a door for opening and closing said opening, means associated with said oven for heating the load to be cooked in said oven, a collector plate associated with said oven remote from said load, and means producing an electrostatic field between said load and said collector plate, said field being of sufficient intensity so as to induce movement of grease particles and the like from said load to said collector plate.

3. A liquid collecting apparatus for an oven having heating means associated therewith comprising, a collector member associated with said oven, load carrying support means associated with said oven and electrically insulated from said collector member, and a direct current voltage source connected across said member and support means, said voltage source producing an electrostatic field between said support means and member whereby liquid particles generated by the heating of said load on said support are drawn to said collector member.

4. Apparatus for collecting grease and the like from food cooking in an oven comprising, a collecting electrode and a substantially horizontal pan supporting electrode located in spaced relationship, said supporting electrode insulated from said collecting electrode and adapted to support the food to be cooked, and means for producing an electrostatic field between said collecting and supporting electrodes whereby grease and the like are drawn from said food to said collecting electrode.

References Cited in the file of this patent

UNITED STATES PATENTS

| Number | Name | Date |
|---|---|---|
| 1,022,012 | Whitney | Apr. 2, 1912 |
| 2,297,601 | Williams | Sept. 29, 1942 |
| 2,428,615 | Brown | Oct. 7, 1947 |
| 2,464,403 | Klingaman | Mar. 15, 1949 |
| 2,511,790 | Scofield | June 13, 1950 |
| 2,560,763 | Griffith | July 17, 1951 |
| 2,565,454 | MacKenzie et al. | Aug. 21, 1951 |
| 2,585,799 | Lawrence | Feb. 12, 1952 |
| 2,729,735 | Fries | Jan. 3, 1956 |